(12) United States Patent
Han (10) Patent No.: US 8,422,818 B2
(45) Date of Patent: Apr. 16, 2013

(54) METHOD AND APPARATUS FOR IMAGE PROCESSING

(75) Inventor: Hee-chul Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 547 days.

(21) Appl. No.: 12/708,930

(22) Filed: Feb. 19, 2010

(65) Prior Publication Data
US 2011/0026815 A1 Feb. 3, 2011

(30) Foreign Application Priority Data
Jul. 28, 2009 (KR) .................. 10-2009-0068960

(51) Int. Cl.
*G06K 9/40* (2006.01)

(52) U.S. Cl.
USPC ........... 382/275; 382/167; 382/272; 382/260; 382/254

(58) Field of Classification Search .................. 382/275, 382/167, 272, 260, 254
See application file for complete search history.

(56) References Cited

U.S. PATENT DOCUMENTS

| | | | | |
|---|---|---|---|---|
| 5,081,692 | A * | 1/1992 | Kwon et al. | 382/263 |
| 5,969,753 | A * | 10/1999 | Robinson | 348/130 |
| 7,082,218 | B2 * | 7/2006 | Pollard et al. | 382/167 |
| 7,171,057 | B1 * | 1/2007 | Wilensky et al. | 382/284 |
| 7,206,018 | B2 * | 4/2007 | Kondo et al. | 348/208.4 |
| 7,512,288 | B1 * | 3/2009 | Wilensky et al. | 382/300 |
| 7,876,974 | B2 * | 1/2011 | Brajovic | 382/264 |
| 2002/0177780 | A1 * | 11/2002 | Sendai | 600/476 |
| 2004/0028271 | A1 * | 2/2004 | Pollard et al. | 382/162 |
| 2005/0089239 | A1 * | 4/2005 | Brajovic | 382/266 |
| 2006/0187509 | A1 * | 8/2006 | Blonde et al. | 359/23 |
| 2007/0009167 | A1 * | 1/2007 | Dance et al. | 382/254 |
| 2007/0071350 | A1 | 3/2007 | Lee et al. | |

FOREIGN PATENT DOCUMENTS

| | | |
|---|---|---|
| EP | 1 482 447 A1 | 12/2004 |
| EP | 1482447 A1 * | 12/2004 |
| EP | 2 076 013 A2 | 7/2009 |
| EP | 2076013 A2 * | 7/2009 |

OTHER PUBLICATIONS

Fast-images, Durand et al. , XP-002312495, 2002, pp. 257-266.*
Color correction for tone mapping, Heidrich et al.,Eurographics 2009 XP-002596979, vol. 28, pp. 1-10.*
Fast Bilateral-Images, Dorsey et al., ACM, XP-002312495, 2002 pp. 257-266.*
Durand, F. "Fast Bilateral Filtering for the Display of High-Dynamic-Range Images". ACM Transactions on Graphics, ACM< US vol. 21, No. 3, Jul. 1, 2002, pp. 257-266.
Mantiuk, R. "Color correction for tone mapping". Blackwell Publishing Ltd., vol. 28, No. 2, Apr. 2009, pp. 193-202.
European Search Report, dated Aug. 31, 2010, issued in application No. 10159315.0.

* cited by examiner

*Primary Examiner* — Jayesh A Patel
(74) *Attorney, Agent, or Firm* — Sughrue Mion, PLLC (57) ABSTRACT

A method and apparatus for image processing are provided. The method may include generating a first restoration image by removing distortion components from an original image; determining a mixing ratio between the original image and the first restoration image based on distortion information of a region of interest in the original image; and generating a second restoration image by mixing the original image and the first restoration image according to the mixing ratio.

25 Claims, 4 Drawing Sheets

METHOD AND APPARATUS FOR IMAGE PROCESSING

CROSS-REFERENCE TO RELATED PATENT APPLICATION

This application claims priority from Korean Patent Application No. 10-2009-0068960, filed on Jul. 28, 2009, in the Korean Intellectual Property Office, the disclosure of which is incorporated herein in its entirety by reference.

BACKGROUND

1. Field

Methods and apparatuses consistent with the inventive concept relate to a method and apparatus for image processing, and more particularly, to processing an image by using an edge-preserving smoothing filter.

2. Description of the Related Art

Accurately realizing a scene seen by the human vision system on an image output apparatus is the most ideal target and the most difficult problem in image processing technology because a scene seen by human eyes has a very large luminance dynamic range while a camera cannot completely realize the luminance dynamic range.

In particular, when a camera photographs a subject, if an exposure time is not appropriately set or an abnormal illumination is used, a captured scene is different from a scene seen by the human vision system.

As such, improved technology for processing image distortion occurring due to a difference between a captured scene and a scene seen by the human vision system is continuously demanded.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a method and apparatus for effectively processing an image.

According to an exemplary embodiment, there is provided a method of image processing including generating a first restoration image by removing distortion components from an original image; determining a mixing ratio between the original image and the first restoration image based on distortion information of a region of interest in the original image; and generating a second restoration image by mixing the original image and the first restoration image according to the mixing ratio.

The determining of the mixing ratio may include determining the mixing ratio based on an average value and a standard deviation value of luminance components in the original image.

The generating of the second restoration image may include mixing the region of interest and a region in the first restoration image that corresponds to the region of interest, according to the mixing ratio.

The method may further include receiving a user's input for selecting the region of interest via an interface.

The generating of the first restoration image may include dividing the original image into a base layer, a detail layer and a color layer by using an edge-preserving smoothing filter; and removing distortion components from each of the base layer, the detail layer and the color layer.

The removing of the distortion components may include processing the base layer such that a variation amount of a luminance dynamic range in a shadow region is greater than that in a highlight region.

The removing of the distortion components may include decreasing detail components in a shadow region and increasing detail components in a highlight region.

The removing of the distortion components may include correcting the color layer based on a variation amount between luminance components in the original image and luminance components in the first restoration image.

The method may further include combining the base layer, the detail layer and the color layer, from which the distortion components are removed.

The edge-preserving smoothing filter may include one selected from the group consisting of a bilateral filter, a sigma filter and a mean shift filter.

According to exemplary embodiment, there is provided an apparatus for image processing including an image restoration unit generating a first restoration image by removing distortion components from an original image; a mixing ratio determination unit determining a mixing ratio between the original image and the first restoration image based on distortion information of a region of interest in the original image; and an image mixing unit generating a second restoration image by mixing the original image and the first restoration image according to the mixing ratio.

BRIEF DESCRIPTION OF THE DRAWINGS

The above and other features and aspects will become more apparent by describing in detail exemplary embodiments thereof with reference to the attached drawings in which.

DETAILED DESCRIPTION OF THE EXEMPLARY EMBODIMENTS

Hereinafter, exemplary embodiments will be described in detail with reference to the attached drawings.

Figure 1:
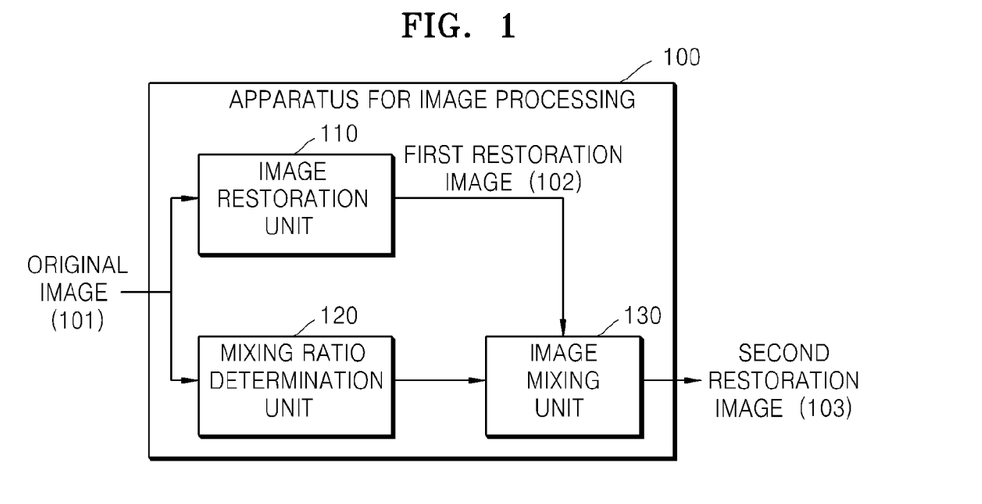
FIG. 1 is a block diagram of an apparatus for image processing, according to an exemplary embodiment.

FIG. 1 is a block diagram of an apparatus 100 for image processing, according to an exemplary embodiment.

Referring to FIG. 1, the apparatus 100 includes an image restoration unit 110, a mixing ratio determination unit 120 and an image mixing unit 130.

The image restoration unit 110 removes distortion components from an original image 101 and generates a first restoration image 102. The image restoration unit 110 converts the original image 101 consisting of red (R), green (G) and blue (B) components into luminance components and color components. Each of the luminance components may be represented as a value obtained by multiplying a lighting component, i.e., the amount of light projected from a light source, by a reflection component, i.e., the amount of light reflected on an object. The image restoration unit 110 divides the luminance components into the lighting components and the reflection components by using a given filter.

According to an exemplary embodiment, an image formed of the lighting components is referred to as a base layer, an image formed of the reflection components is referred to as a detail layer, and an image formed of the color components is referred to as a color layer.

If the original image 101 is divided into the base layer, the detail layer and the color layer, the image restoration unit 110 removes distortion components from each of the base layer, the detail layer and the color layer, combines the base layer, the detail layer and the color layer, and generates the first restoration image 102.

The image restoration unit 110 will be described in detail later with reference to FIG. 2.

The mixing ratio determination unit 120 determines a mixing ratio between the original image 101 and the first restoration image 102 based on distortion information of a region of interest in the original image 101. The region of interest may be selected according to a user's input or may be designated by analyzing the original image 101 without a user's input.

In the former case, the user's input is received via an interface (not shown). The user may select a region having severe distortion in the original image 101 as the region of interest via the interface.

In the latter case, the apparatus 100 may analyze the original image 101 and may select a region having a large number of distortion components in the original image 101 as the region of interest. For example, a region having the largest number of high-luminance components representing a value greater than a threshold value or a region having the largest number of low-luminance components representing a value less than the threshold value may be selected as the region of interest.

The distortion information may be any type of information that may represent a degree of distortion in the region of interest. For example, an average value and a standard deviation value of the luminance components of the original image 101 may be used. Equation 1 shows an example of determining a mixing ratio by using the average value and the standard deviation value of the luminance components of the original image 101.

$$\alpha = \left| \max\left(-\rho, \min\left(\rho, \frac{z}{z_{max}}\right)\right) \right|$$ Equation 1

In Equation 1, Z=(a target average luminance value−an average luminance value)/the standard deviation value, and Z represents a standard score. If luminance values are between values 0 and 255, the target average luminance value may be a value 125.

Zmax represents a predefined maximum standard score, and ρ represents a predefined maximum value of Z/Zmax.

If a strongly lighted image or a weakly lighted image exists, the image may have severe distortion. The standard score Z of an image having severe distortion may be large (or small), and thus the mixing ratio may be increased (or decreased).

The image mixing unit 130 mixes the original image 101 and the first restoration image 102 according to the mixing ratio and generates a second restoration image 103. In more detail, the image mixing unit 130 adds pixel values of the original image 101 to pixel values of the first restoration image 102 with different weights according to the mixing ratio. The added pixel values are determined as pixel values of the second restoration image 103. For example, if the original image 101 has a pixel value of 200, the first restoration image 102 has a pixel value of 120, and the mixing ratio is 1:3, a corresponding pixel value of the second restoration image 103 may be determined as a value 140 (200*0.25+120*0.75=140).

The image mixing unit 130 may mix entire regions of the original image 101 and the first restoration image 102. Alternatively, the image mixing unit 130 may mix only partial regions of the original image 101 and the first restoration image 102. For example, for the second restoration image 103, only the region of interest of the original image 101 and a region of the first restoration image 102 that corresponds to the region of interest may be mixed and remaining regions of the second restoration image 103 may be either remaining regions of the original image 101 or remaining regions of the first restoration image 102. In an exemplary embodiment, the corresponding region refers to a region of the first restoration image 102 that corresponds to the region of interest. The mixing of only partial regions of the original image 101 and the first restoration image 102 is appropriate when distortion components are concentrated in a certain region, such as in backlight images.

Figure 2:
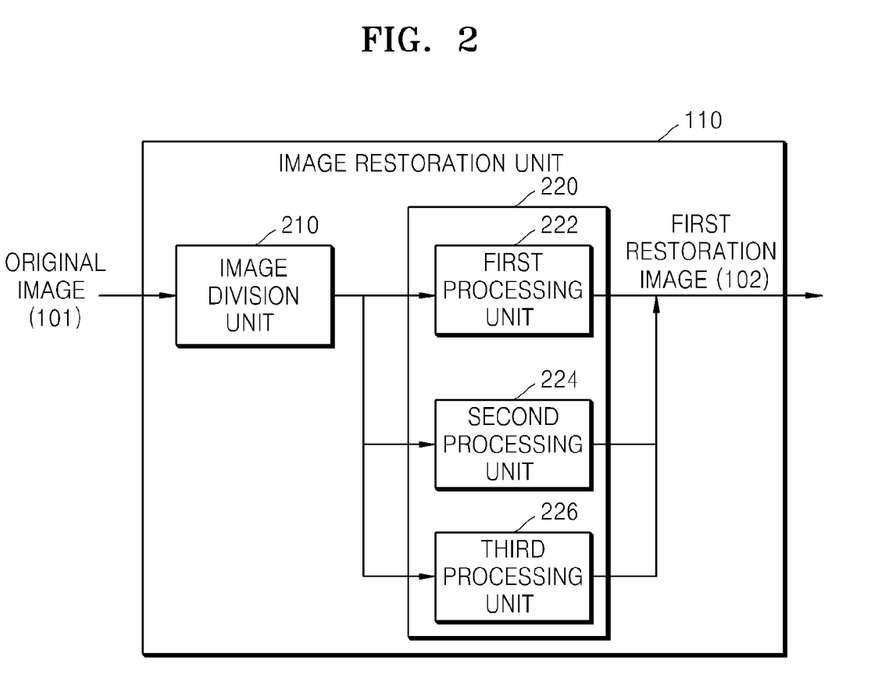
FIG. 2 is a block diagram of an image restoration unit of the apparatus illustrated in FIG. 1.

FIG. 2 is a block diagram of the image restoration unit 110 illustrated in FIG. 1.

Referring to FIG. 2, the image restoration unit 110 may include an image division unit 210 and a processing unit 220.

The image division unit 210 divides the original image 101 into the base layer, the detail layer and the color layer. Although various filters such as a single-scale retinex (SSR), a multi-scale retinex (MSR) and a multi-scale retinex with color restoration (MSRCR) may be used, the image division unit 210 may use an edge-preserving smoothing filter in order to prevent problems such as a halo effect, color distortion and noise amplification. The image division unit 210 may use a bilateral filter, a sigma filter or a mean shift filter as the edge-preserving smoothing filter.

The processing unit 220 removes distortion components from each of the base layer, the detail layer and the color layer. The processing unit 220 may include a first processing unit 222 removing the distortion components from the base layer, a second processing unit 224 removing the distortion components from the detail layer, and a third processing unit 226 removing the distortion components from the color layer.

The first processing unit 222 processes the base layer such that a variation amount of a luminance dynamic range in a shadow region is greater than that in a highlight region. The human vision system may identify an object even in a shadow region by increasing the sensitivity of contrast in the shadow region. As in the human vision system, the first processing unit 222 allows a variation amount of the luminance dynamic range in the shadow region to be greater than that in the highlight region.

The first processing unit 222 may use an S-shaped curve such as a log curve, a double logistic curve, a loglog curve, a Witch of Agnesi curve, or a logistic curve. The S-shaped curve may be formed such that a ratio of an input luminance value and an output luminance value is greater in the shadow region than in the highlight region.

The first processing unit 222 may process the base layer by using Equation 2.

$$y = \log(x+1) - \alpha \log(\log(x)+1) \qquad \text{Equation 2}$$

In Equation 2, x represents a luminance component of the base layer and y represents an output luminance component. A method of removing distortion components in the base layer by using Equation 2 in the first processing unit 222 will be described later with reference to FIG. 3.

The second processing unit 224 processes the detail layer such that noise in the shadow region is removed while details in the highlight region are maintained. In general, detail components and noise components are mixed in the detail layer. In this case, a ratio of noise components/detail components in the shadow region is greater than that in the highlight region. That is, the amount of noise components is relatively great in the shadow region. In particular, since the first processing unit 222 greatly increases the luminance dynamic range in the shadow region, the luminance dynamic range is also increased in the shadow region. In order to prevent increase of noise in the shadow region, the second processing unit 224 decreases the detail components in the shadow region and increases the detail components in the highlight region.

The second processing unit 224 may process the detail layer by using Equation 3.

$$i(x) = \frac{x_i}{x_s} * p(x) \qquad \text{Equation 3}$$

In Equation 3, i(x) represents a detail component of a pixel x, $x_i$ represents a luminance component of the pixel x in the original image 101, $x_s$ represents a luminance component of the pixel in the base layer, and p(x) represents an edge damping term.

The detail component i(x) may be obtained by dividing the luminance component $x_i$ of the original image 101 by the luminance component $x_s$ in the base layer. The second processing unit 224 calculates the detail component i(x) by dividing the luminance component $x_i$ of the original image 101 by the luminance component $x_s$ in the base layer and multiplying by the edge damping term p(x). In this case, noise in the shadow region may be removed and details in the highlight region may become clear by appropriately controlling the edge damping term p(x).

Equation 4 shows an example of the edge damping term p(x).

$$p(x) = \log\left(\frac{x_i}{\rho}\right) \qquad \text{Equation 4}$$

In Equation 4, $x_i$ represents a luminance component of a pixel x in the original image 101, and ρ represents a constant value. If necessary, a constant may be added into the log function such that the log function has a value greater than '0'.

A value of the luminance component $x_i$ of the original image 101 at which the edge damping term p(x) has a value greater than '1', may be determined by appropriately controlling the constant value ρ. If the edge damping term p(x) has a value less than '1', the detail components are decreased. If the edge damping term p(x) has a value greater than '1', the detail components are increased.

Although a log function is used in Equation 4, another type of S curve such as a loglog function may also be used.

A method of processing detail components in the second processing unit 224 will be described later with reference to FIG. 4.

A luminance component of a first restoration image 102 may be obtained by using result values of the first and second processing units 222 and 224. Equation 4 is an exemplary equation for obtaining the luminance components of the first restoration image 102.

$$E = s(E_1 + E_2) \qquad \text{Equation 5}$$

In Equation 5, E represents the luminance components of the first restoration image 102, $E_1$ represents the base layer from which distortion components are removed, $E_2$ represents the detail layer from which distortion components are removed, and s( ) represents a movement/expansion function using a standard deviation.

The movement/expansion function s( ) appropriately spreads the result values of the first and second processing units 222 and 224.

For example, it is assumed that the first processing unit 222 processes the base layer according to Equation 2 and that a minimum range of input luminance values is '0~255'.

A minimum value of an output luminance component y is '0' and a maximum value of the output luminance component y is 'log 255−log(log 255)', which is approximately '2'. That is, a range of the output luminance component y is decreased to '0~2'. The movement/expansion function s( ) spreads the range of the output luminance component y back to the range of '0~255' by using various methods such as a linear expansion method, an exponential expansion method, or a logarithmic expansion method.

The third processing unit 226 corrects the color layer based on a ratio of a luminance component in the original image 101 and a luminance component in the first restoration image 102. That is, a color component is corrected based on a variation amount of a luminance component.

The third processing unit 226 may perform color correction based on Equation 6.

$$C_{out} = C_{in} * \tau * \frac{L'}{L} \qquad \text{Equation 6}$$

In Equation 6, $C_{out}$ represents a color component of the first restoration image 102, $C_{in}$ represents a color component of the original image 101, τ represents a parameter, L' represents a luminance component of the first restoration image 102, and L represents a luminance component of the original image 101. Although the color component $C_{out}$ of the first restoration image 102 is proportional to $C_{in}*\tau$ Equation 6, according to another exemplary embodiment, the color component $C_{out}$ of the first restoration image 102 may be proportional to $C_{in}\hat{}\tau$ or $C_{in}*\log \tau$.

Although the luminance component L of the original image 101 is processed by the first and second processing units 222 and 224, saturation of the original image 101 is not increased and thus a color tone is decreased. Accordingly, the saturation of the color component $C_{in}$ of the original image 101 has to be appropriately controlled. Natural colors may be realized by controlling saturation based on variation amounts of luminance components.

The image restoration unit 110 may further include a combination unit (not shown). The combination unit combines a luminance component and a color component of the first restoration image 102, from which distortion components are removed, and converts the combination into an RGB component.

Figure 3:
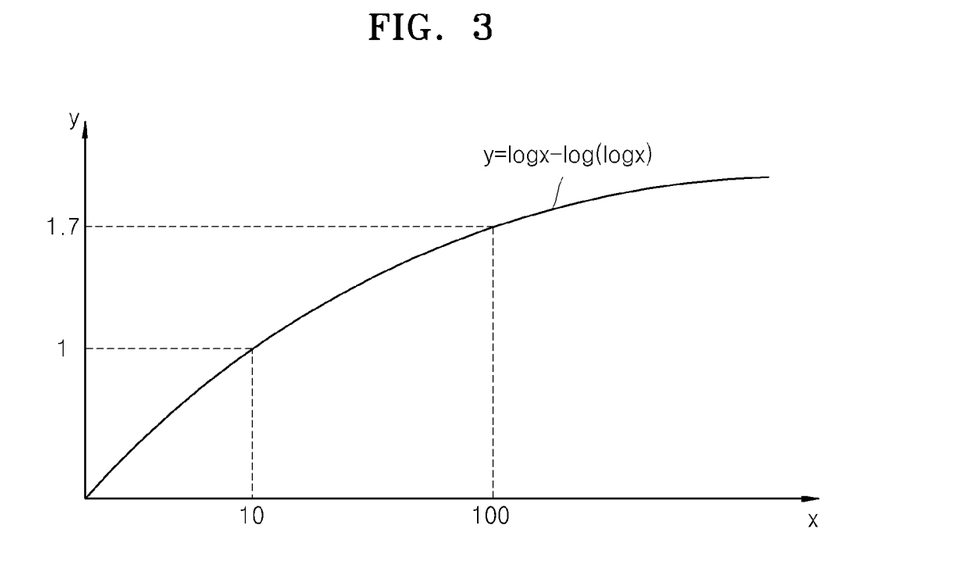
FIG. 3 is a graph showing an example of an S curve used in a first processing unit of the image restoration unit illustrated in FIG. 2, according to an exemplary embodiment.

FIG. 3 is a graph showing an example of an S curve used in the first processing unit 222 illustrated in FIG. 2, according to an exemplary embodiment.

In FIG. 3, a horizontal axis represents an input luminance value and a vertical axis represents an output luminance value. For convenience of explanation, the scale of the vertical axis is magnified ten times that of the horizontal axis. The S curve of FIG. 3 satisfies y=log(x)−log(log(x)). According to the S curve of FIG. 3, if '10' and '100' are input as input luminance values, '1' and '1.7' are respectively output as output luminance values.

It is assumed that '9', '10', '200', and '201' may also be input as input luminance values. Pixels having the input luminance values of '9' and '10' may correspond to a shadow region and pixels having the input luminance values of '200' and '201' may correspond to a highlight region.

Referring to FIG. 3, y(10)−y(9) is greater than y(201)−y(200). That is, in a shadow region, a difference of output luminance values is relatively large although the difference of input luminance values is small. As such, a value range of luminance components in the shadow region is increased. That is, a luminance dynamic range is expanded. On the other hand, in a highlight region, a difference of output luminance values is less than the difference of input luminance values. Accordingly, a luminance dynamic range in the highlight region is not greatly expanded.

As such, a shadow region may be effectively brightened by increasing a luminance dynamic range in a shadow region more than that in a highlight region.

Figure 4:
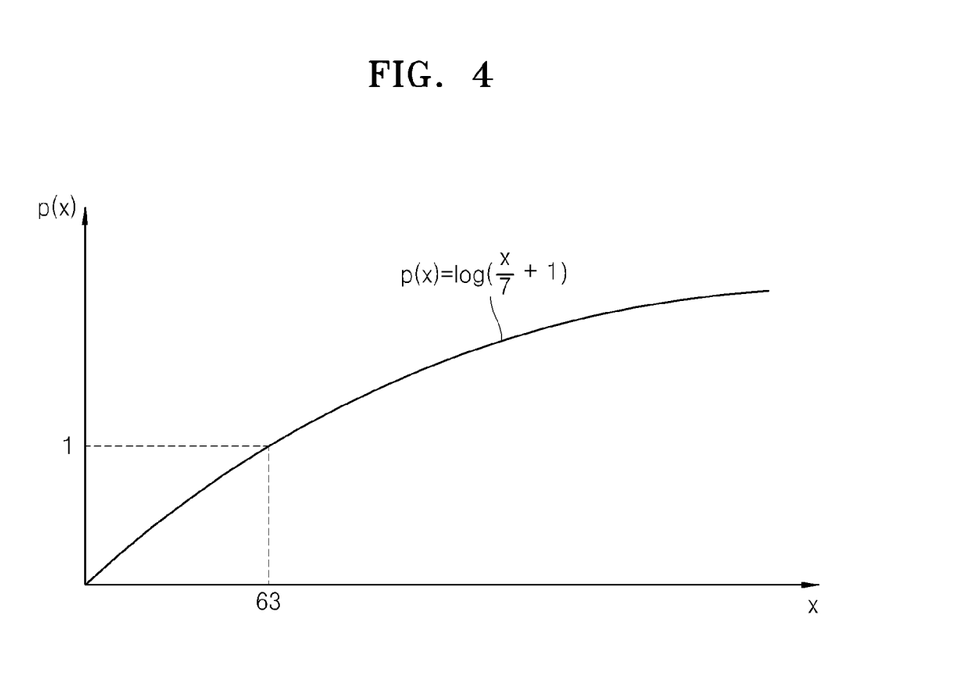
FIG. 4 is a graph showing an example of an S curve used in a second processing unit of the image restoration unit illustrated in FIG. 2, according to an exemplary embodiment.

FIG. 4 is a graph showing an example of an S curve used in the second processing unit 224 illustrated in FIG. 2, according to an exemplary embodiment.

The S curve of FIG. 4 satisfies $$p(x) = \log\left(\frac{x}{\sigma} + 1\right).$$

In FIG. 4, a constant σ has a value '7', a horizontal axis represents an input luminance value of an original image, and a vertical axis represents a value of an edge damping term. Also, for convenience of explanation, the scale of the vertical axis is magnified ten times that of the horizontal axis.

Referring to FIG. 4, if an input luminance value x is '63', an edge damping term p(x) is '1'. Thus, if the input luminance value x is less than '63', the edge damping term p(x) is less than '1'. As a result, the edge damping term p(x) is less than '1' in a shadow region and is greater than '1' in a highlight region.

A boundary point where the output luminance value p(x) is '1' varies according to a value of the constant σ. Thus, the output luminance value p(x) having a desired value may be designed to be '1' by controlling the value of the constant σ.

As described above with reference to FIG. 2, a detail component of a first restoration image may be calculated by dividing a luminance component of an original image by a luminance component in a base layer and multiplying by an edge damping term. According to the S curve of FIG. 4, the edge damping term has a value less than '1' in a shadow region and has a value greater than '1' in a highlight region. Thus, noise is removed by decreasing detail components in the shadow region. Also, the edge damping term allows detail components in the highlight region to be clear so as to show edges clear.

Figure 5:
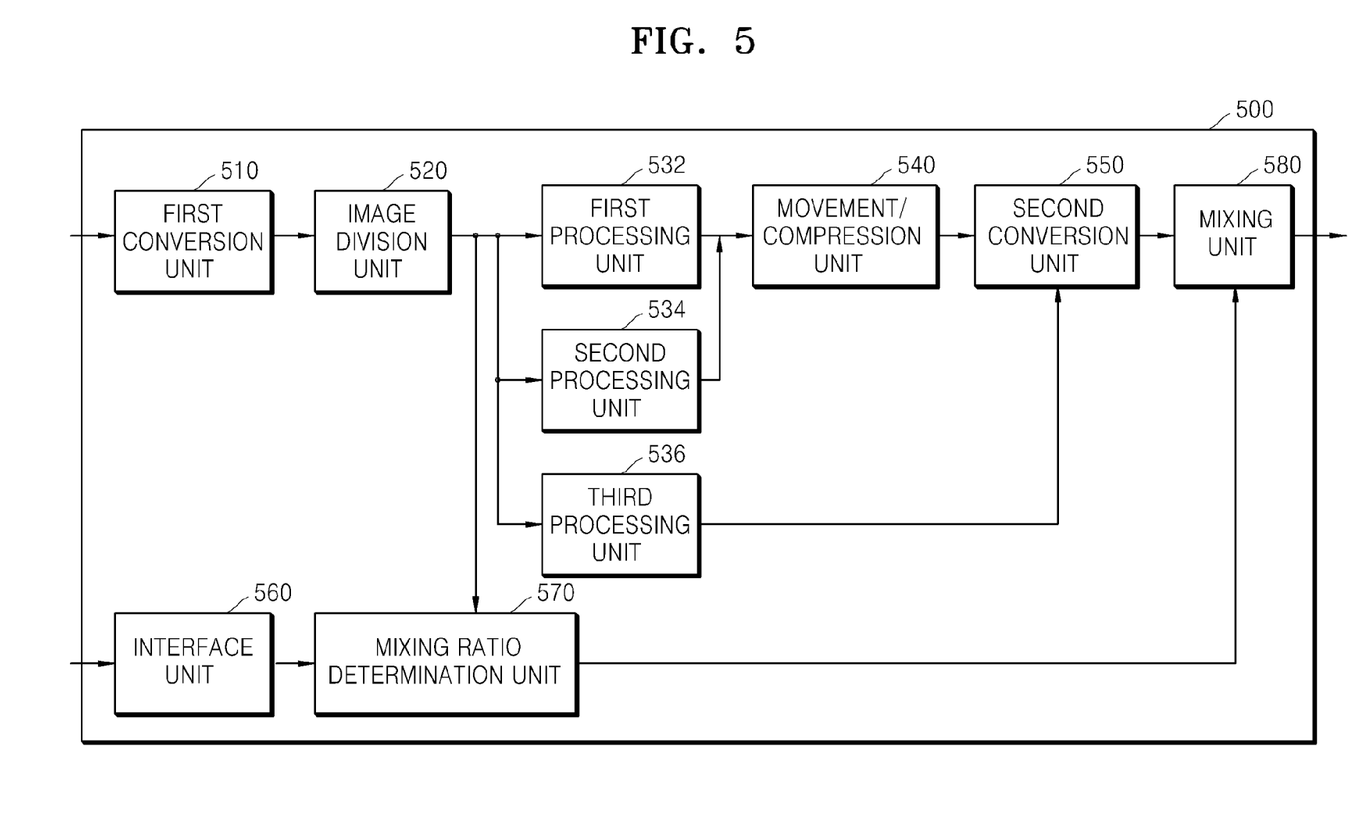
FIG. 5 is a block diagram of an apparatus for image processing, according to an exemplary embodiment.

FIG. 5 is a block diagram of an apparatus 500 for image processing, according to an exemplary embodiment.

Referring to FIG. 5, the apparatus 500 includes a first conversion unit 510, an image division unit 520, a first processing unit 532, a second processing unit 534, a third processing unit 536, a movement/compression unit 540, a second conversion unit 550, an interface unit 560, a mixing ratio determination unit 570 and a mixing unit 580.

As in the human vision system, the first conversion unit 510 divides an input image formed of RGB components into luminance components and color components. The luminance components are corrected by the first and second processing units 532 and 534 to be described later and the color components are corrected by the third processing unit 536 to be described later.

The image division unit 520 divides the original image into a base layer, a detail layer and a color layer by using an edge-preserving smoothing filter.

The first processing unit 532 expands a luminance dynamic range in the base layer. In particular, as in the human vision system, the first processing unit 532 increases the sensitivity of contrast in a shadow region by processing the base layer such that a variation amount of the luminance dynamic range in the shadow region is greater than that in a highlight region.

The second processing unit 534 processes the detail layer such that noise components are removed from the shadow region and that detail components are maintained clear in the highlight region. In more detail, a variation amount of a detail component in the shadow region differs from that in the highlight region by allowing an edge damping term to have a value less than '1' in the shadow region and to have a value greater than '1' in the highlight region.

The third processing unit 536 processes the color layer based on a variation amount between a luminance component of a first restoration image and the luminance component of the original image.

The movement/compression unit 540 expands a range of result values of the first and second processing units 532 and 534. The movement/compression unit 540 may expand the result value by using a linear expansion method or a non-linear expansion method.

The second conversion unit 550 receives the luminance components of the first restoration image from the movement/compression unit 540, receives the color components of the first restoration image from the third processing unit 536, and converts the luminance components and the color components into the RGB components.

The interface unit 560 receives a user's input for selecting a region of interest.

The mixing ratio determination unit 570 determines a mixing ratio between the original image and the first restoration image based on distortion information of the region of interest.

The mixing unit 580 mixes the original image and the first restoration image according to the mixing ratio.

Figure 6:
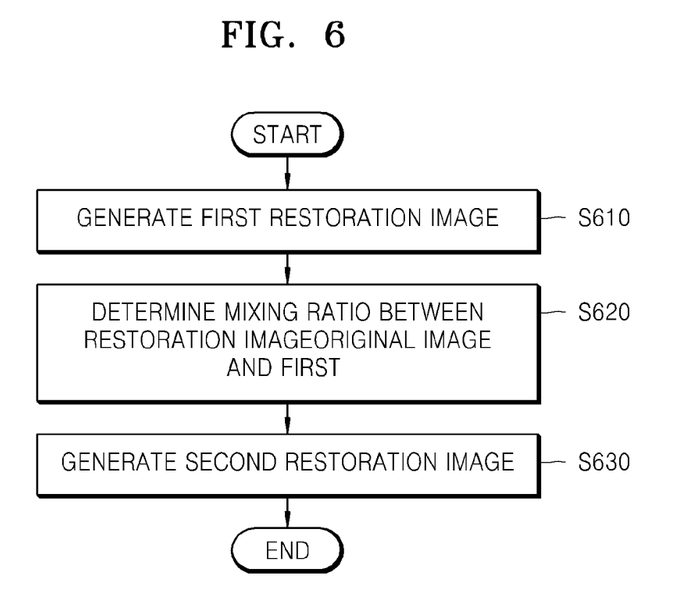
FIG. 6 is a flowchart of a method for image processing, according to an exemplary embodiment.

FIG. 6 is a flowchart of a method for image processing, according to an exemplary embodiment.

Referring to FIG. 6, in operation s610, a first restoration image is generated by removing distortion components from an original image. Operation s610 may include processing a base layer such that a variation amount of a luminance dynamic range in a shadow region is greater than that in a highlight region; decreasing detail components in the shadow region and increasing the detail components in the highlight region; and correcting a color layer based on a variation amount between luminance components in the original image and the luminance components in the first restoration image.

In operation s620, a mixing ratio between the original image and the first restoration image is determined based on distortion information of a region of interest in the original image. The mixing ratio may be determined based on an average value and a standard deviation value of the luminance components in the original image.

In operation s630, a second restoration image is generated by mixing the original image and the first restoration image according to the mixing ratio. Entire regions of the original image and the first restoration image may be mixed. Alternatively, only partial regions of the original image and the first restoration image may be mixed.

The above exemplary embodiments can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), etc.

The foregoing exemplary embodiments are merely exemplary and are not to be construed as limiting the scope of the claims. Various changes in form and details will be apparent to those of ordinary skill in the art.

What is claimed is:

1. A method of image processing comprising:
    generating a first restoration image by removing distortion components from an original image;
    determining a mixing ratio between the original image and the first restoration image based on distortion information of a region of interest in the original image; and
    generating a second restoration image by mixing the original image and the first restoration image according to the mixing ratio,
    wherein the generating of the second restoration image comprises mixing a first pixel in the original image and a corresponding second pixel in the first restoration image according to the determined mixing ratio, and mixing a third pixel in the original image and a corresponding fourth pixel in the first restoration image according to the determined mixing ratio.

2. The method of claim 1, wherein the determining of the mixing ratio comprises determining the mixing ratio based on an average value and a standard deviation value of luminance components in the original image.

3. The method of claim 1, wherein the mixing the first pixel and the corresponding second pixel and the mixing the third pixel and the corresponding fourth pixel comprises mixing pixels in the region of interest in the original image and pixels in a region in the first restoration image that corresponds to the region of interest, according to the mixing ratio.

4. The method of claim 1, further comprising receiving a user's input for selecting the region of interest via an interface.

5. The method of claim 1, wherein the generating of the first restoration image comprises:
    dividing the original image into a base layer, a detail layer and a color layer; and
    removing distortion components from each of the base layer, the detail layer and the color layer.

6. The method of claim 5, wherein the removing of the distortion components comprises processing the base layer such that a variation amount of a luminance dynamic range in a shadow region is greater than a variation amount of a luminance dynamic range in a highlight region.

7. The method of claim 5, wherein the removing of the distortion components comprises decreasing detail components in a shadow region and increasing detail components in a highlight region.

8. The method of claim 5, wherein the removing of the distortion components comprises correcting the color layer based on a variation amount between at least one luminance component in the original image and at least one luminance component in the first restoration image.

9. The method of claim 5, further comprising combining the base layer, the detail layer and the color layer, from which the distortion components are removed.

10. The method of claim 5, wherein the dividing the original image comprises dividing the original image into the base layer, the detail layer, and the color layer using an edge preserving smoothing filter.

11. The method of claim 10, wherein the edge-preserving smoothing filter comprises one selected from the group consisting of a bilateral filter, a sigma filter and a mean shift filter.

12. The method of claim 1, further comprising selecting a region of the original image having the largest number of luminance components representing a value above a predetermined threshold value as the region of interest.

13. The method of claim 1, wherein the mixing the first pixel and the corresponding second pixel and the mixing the third pixel and the corresponding fourth pixel comprises adding the first pixel and the second pixel according to different weights applied thereto and adding the third pixel and the fourth pixel according to the different weights applied thereto.

14. An apparatus for image processing comprising:
    an image restoration unit that removes distortion components from an original image and generates a first restoration image;
    a mixing ratio determination unit that determines a mixing ratio between the original image and the first restoration image based on distortion information of a region of interest in the original image; and
    an image mixing unit that generates a second restoration image by mixing the original image and the first restoration image according to the mixing ratio,
    wherein the image mixing unit mixes a first pixel in the original image and a corresponding second pixel in the first restoration image according to the determined mixing ratio, and mixes a third pixel in the original image and a corresponding fourth pixel in the first restoration image according to the determined mixing ratio,
    wherein at least one of the image restoration unit, the mixing ratio determination unit, and the image mixing unit is implemented in a hardware component.

15. The apparatus of claim 14, wherein the mixing ratio determination unit determines the mixing ratio based on an average value and a standard deviation value of luminance components in the original image.

16. The apparatus of claim 14, wherein the image mixing unit mixes pixels in the region of interest in the original image and pixels in a region in the first restoration image that corresponds to the region of interest, according to the mixing ratio.

17. The apparatus of claim 14, further comprising an interface unit that receives a user's selection of the region of interest.

18. The apparatus of claim 14, wherein the image restoration unit comprises:

an image division unit that divides the original image into a base layer, a detail layer and a color layer;

a processing unit that removes distortion components from each of the base layer, the detail layer and the color layer.

19. The apparatus of claim 18, wherein the processing unit comprises a first processing unit that processes the base layer such that a variation amount of a luminance dynamic range in a shadow region is greater than a variation amount of a luminance dynamic range in a highlight region.

20. The apparatus of claim 18, wherein the processing unit comprises a second processing unit that decreases detail components in a shadow region and increasing detail components in a highlight region.

21. The apparatus of claim 18, wherein the processing unit comprises a third processing unit that corrects the color layer based on a variation amount between at least one luminance component in the original image and at least one luminance component in the first restoration image.

22. The apparatus of claim 18, further comprising a combination unit that combines the base layer, the detail layer and the color layer, from which the distortion components are removed.

23. The apparatus of claim 18 wherein the image division unit divides the original image into the base layer, the detail layer, and the color layer by using an edge-preserving smoothing filter.

24. The apparatus of claim 18, wherein the edge-preserving smoothing filter comprises one selected from the group consisting of a bilateral filter, a sigma filter and a mean shift filter.

25. A non-transitory computer readable recording medium having recorded thereon a computer program for executing a method of image processing comprising:

generating a first restoration image by removing distortion components from an original image;

determining a mixing ratio between the original image and the first restoration image based on distortion information of a region of interest in the original image; and generating a second restoration image by mixing the original image and the first restoration image according to the mixing ratio, wherein the generating of the second restoration image comprises mixing a first pixel in the original image and a corresponding second pixel in the first restoration image according to the determined mixing ratio, and mixing a third pixel in the original image and a corresponding fourth pixel in the first restoration image according to the determined mixing ratio.

* * * * *